United States Patent

Steinhauser

[15] 3,653,048

[45] Mar. 28, 1972

[54] SYSTEM FOR STABILIZING A VISUAL DISPLAY

[72] Inventor: Hayes B. Steinhauser, Lincoln Park, N.J.

[73] Assignee: The Bendix Corporation

[22] Filed: June 25, 1969

[21] Appl. No.: 836,352

[52] U.S. Cl. .................................. 343/112, 325/42, 325/65, 343/114.5
[51] Int. Cl. ........................................................ G01s 5/08
[58] Field of Search ......................... 343/114.5, 108 SM, 112; 325/65, 42

[56] References Cited

UNITED STATES PATENTS 3,237,195   2/1966   Schiffman .............................. 343/112

*Primary Examiner*—Richard A. Farley
*Assistant Examiner*—R. Kinberg
*Attorney*—Plante, Hartz, Smith & Thompson

[57] ABSTRACT

A circuit for stabilizing the display on a cathode ray tube representing the position of transmitting beacons outlining the runway of an airport on which an aircraft is about to land. The beacons transmit pulses which are received by a receiver in the aircraft. Some of the transmitted pulses reflected from the ground are received simultaneously with the transmitted pulses and cause the display to bounce. The stabilizing circuit includes averaging circuits for averaging the transmitted and reflected pulses from each beacon to reduce the effect of the reflected pulses and stabilize the display.

A read out control circuit periodically applies the averaged pulses to deflection means of a cathode ray tube. A synchronizing circuit controls the averaging circuits so that only the pulses from a single beacon are applied to the averaging circuits associated with the beacon.

11 Claims, 4 Drawing Figures

INVENTOR.
HAYES B. STEINHAUSER
BY
Ronald G. Gillespie
ATTORNEY

INVENTOR.
HAYES B. STEINHAUSER

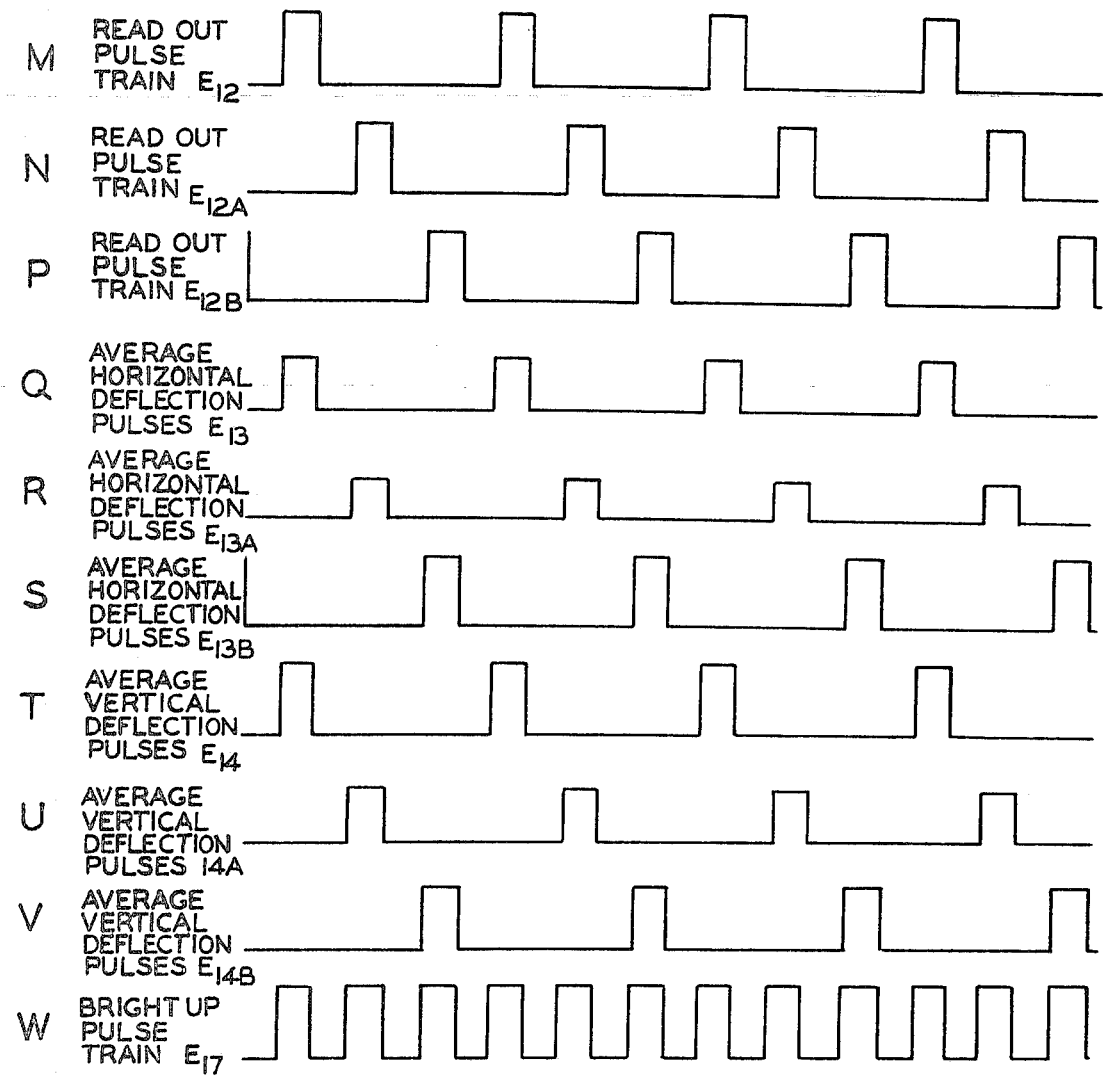
FIG. 2 CON'T

INVENTOR.
HAYES B. STEINHAUSER
BY
Ronald G. Gillespie
ATTORNEY

SYSTEM FOR STABILIZING A VISUAL DISPLAY

BACKGROUND OF THE INVENTION

1. Field of the Invention

This invention pertains to a method and apparatus for providing visual communication through inclement weather particularly for an aircraft.

2. Description of the Prior Art

Systems which aid in landing aircraft in all kinds of weather, such as disclosed in U.S. Pat. No. 3,237,195 issued Feb. 22, 1966 to J. Schiffman and assigned to The Bendix Corporation, assignee of the present invention, uses microwave radio signals beamed to the aircraft by ground beacons located along each edge of a landing runway. These signals are received on the aircraft and processed so as to form an edge light image of the runway on a special head-up cockpit display which provides the pilot with a picture of the runway similar to that formed by runway lights on a clear night.

The ground beacons operate independently of each other. Each beacon emits short microwave pulses at a repetition rate in the low audio range, typically 120 c.p.s. These pulses are received on the aircraft by a special antenna system and microwave receiver which detects each pulse separately and measures its angle of arrival both laterally and vertically, relative to aircraft boresight. These angles are translated into proportional horizontal and vertical deflection voltages which position a cathode ray tube beam to a corresponding angular position. The beam produces a bright spot on the cathode ray tube screen at a position which, when viewed through the head-up viewer unit, will be at the same angle as the angle of arrival of the pulse. The image on the cathode ray tube screen is projected optically onto a small viewing mirror in the pilot's line of sight. Thus, the bright spot appears to the viewer to overlay the visual location of the beacon transmitting that pulse, as seen through the cockpit window.

The spot representing a particular beacon is repeated on the CRT screen each time a pulse is received from that beacon and, due to the persistence of vision, appears without flicker. The presentation of the spots from all the ground beacons allows the pilot to see the pattern in which the ground beacons are arranged and results in a picture of the runaway as through outlined by lights at night. This display can be seen as well through fog and snow as in clear weather.

A radio frequency pulse from a ground beacon may reach the aircraft receiver not only via the direct line of sight path, but also by various reflection paths. At the low transmission angles encountered during a landing approach, the reflected path length will be very nearly the same length as the direct line of sight path, particularly in the usual case of reflection by the ground in front of the ground beacon. The time for the pulse to travel from the beacon to the receiver depends on the length of the transmission path. Thus, the reflected pulse will arrive at almost the same time as the direct pulse and may combine with the direct pulse.

Since the angle of arrival of the reflected pulse is different than the angle of arrival of the direct pulse, the combination of the two will yield a different angle of arrival than the direct pulse alone.

The direct and reflected path lengths are continually changing during an approach. The result is a bounce of the spot representing the beacon on the cathode ray tube. The present invention provides a circuit and a method for smoothing or averaging the spot position.

SUMMARY OF THE INVENTION

In a system providing a display corresponding to a plurality of sources transmitting pulse trains of different phases having a fixed repetition rate and in which the display bounces due to reflected pulses, means for stabilizing the display comprising means for receiving the pulse trains. Means are connected to the receiving means for providing average pulses corresponding to pulses in each pulse train. Other means is connected to the receiving means and to the average pulse means for synchronizing each average pulse means with a corresponding pulse train. Means is connected to the average pulse means for providing the display in accordance with the average pulses.

One object of the present invention is to provide a system providing a stabilized display.

Another object of the present invention is to provide a display system using average deflection pulses corresponding to transmitted pulses from beacons to reduce the effect of reflected pulses on a display.

Another object of the present invention is to provide a display system which distinguishes between different beacons transmitting in random sequence but at a fixed repetition rate so that deflection pulses corresponding to those beacons may be separated according to the beacons and averaged.

Another object of the present invention is to provide a display system which synchronizes itself with transmitted pulses from beacons.

Another object of the present invention is to provide a display system that has an automatic self-starting synchronizing circuit which periodically restarts synchronization to achieve greater accuracy in the synchronization.

Another object of the present invention is to provide a system for displaying dots corresponding to beacons transmitting pulses which eliminates unwanted radar and other signals on the same frequency as the beacons.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
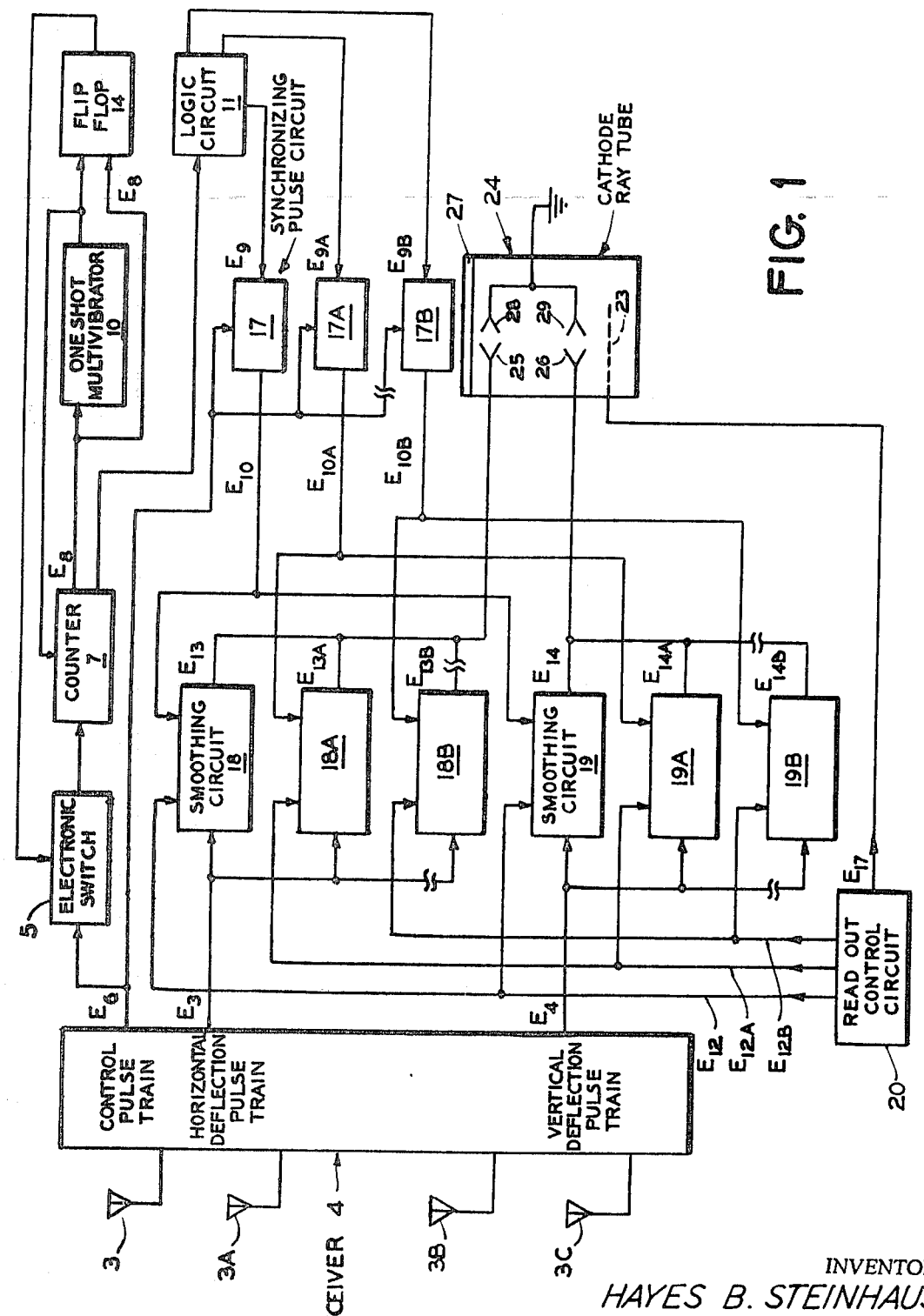
FIG. 1 shows a novel display system constructed in accordance with the present invention for displaying dots corresponding to beacons outlining a runway of an airport. The number of synchronizing pulse circuits and smoothing circuits are reduced in number so as not to confuse the drawing with undue multiplicity of elements. The breaks, with respect to circuits having the suffix "B," are intended to show that similar circuits in excess of the number illustrated may be introduced within the broken portions by simple extrapolation of the circuits illustrated.
Figure 2:
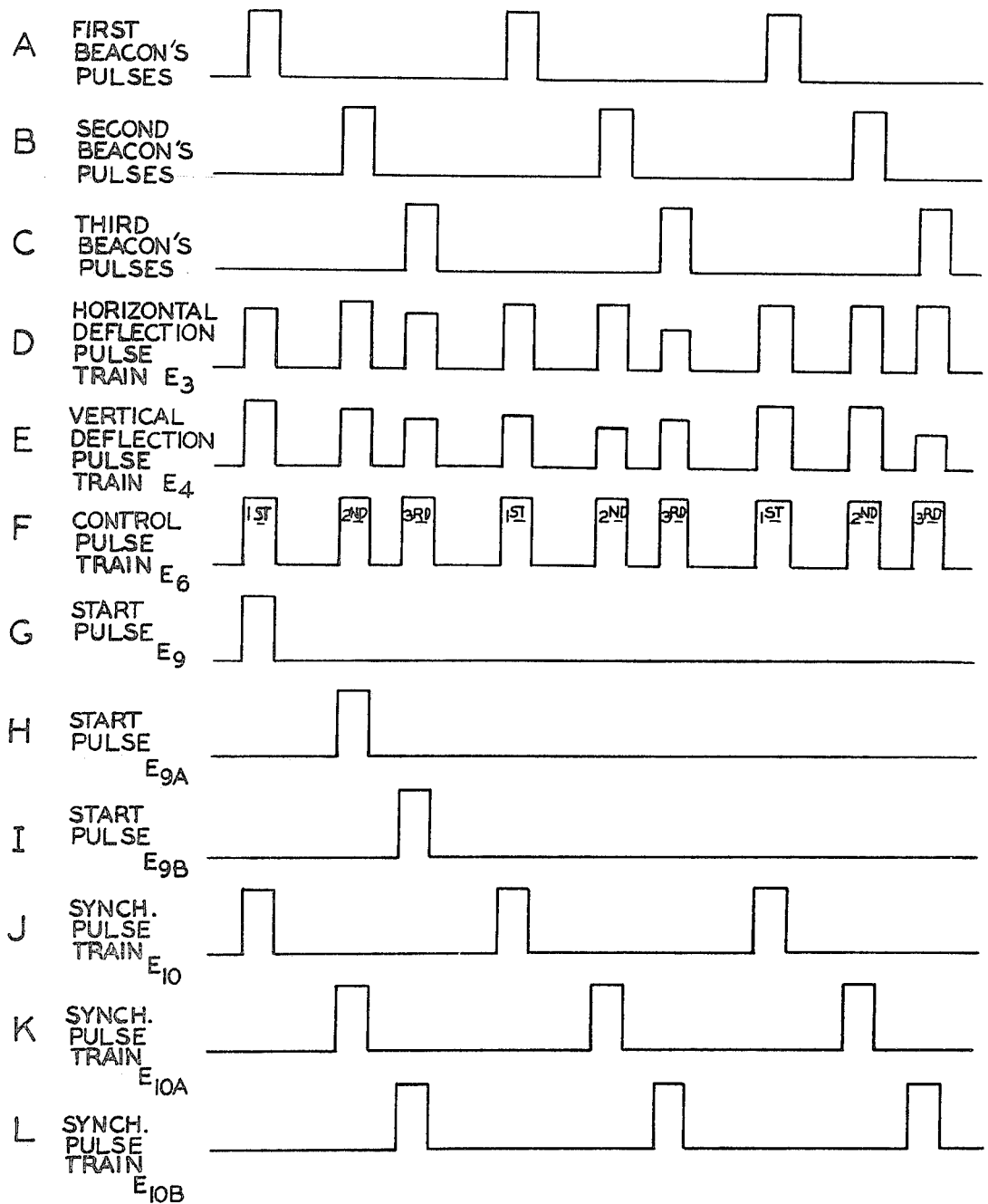
FIG. 2 is a diagrammatic representation showing wave forms provided at various stages of operation of the display system shown in FIG. 1.

Referring to FIG. 1, there is shown a novel display system with stabilization circuitry to eliminate the bounce in a dot display of a landing runway at an airport, having antennae 3, 3A, 3B and 3C receiving transmitted pulses from three ground beacons, as shown in FIGS. 2A, 2B and 2C, and unwanted ground reflected pulses. Although six beacons are used in most landing systems only three beacons are shown in the present application for the sake of simplicity. Antennae 3, 3A, 3B and 3C are connected to a receiver 4 which provides a horizontal deflection pulse train $E_3$, as shown in FIG. 2D, and a vertical deflection pulse train $E_4$, as shown in FIG. 2E, corresponding to the received pulses from the beacons as explained in the Schiffman patent. Receiver 4 also provides a control pulse train $E_6$, as shown in FIG. 2F, in which the pulses coincide with each received pulse. In the Schiffman patent, the pulse train is used to brighten up the display, but in the present application is used for control purposes as hereinafter explained.

The pulses in control pulse train $E_6$ correspond to the beacons. With an all weather landing system using three beacons, the first three pulses correspond to the three beacons, as shown in FIGS. 2A, 2B, 2C and 2F. The pulses corresponding to a particular beacon always occur every third pulse after the initial pulse corresponding to that beacon, as shown in FIG. 2F.

Receiver 4 applies control pulse train $E_6$ to a synchronizing network which provides synchronizing pulse trains in response to control pulse train $E_6$ for controlling pairs of smoothing circuits. Each pair of smoothing circuits provides average deflection pulses corresponding to transmitted pulses from a corresponding beacon as hereinafter explained. The synchronizing network includes an electronic switch 5, a counter 7, a one shot multivibrator 10 and a flip-flop 14 connected in series to receiver 4 and a logic circuit 11 connecting identical synchronizing pulse circuits 17, 17A and 17B to counter 7. Control pulse train $E_6$ is applied to switch 5 which controls the application of control pulse train $E_6$ to counter 7. Initially switch 5 passes control pulse train $E_6$. Counter 7 counts the pulses in the control pulse train $E_6$ and provides a plurality of outputs to logic circuit 11 to start synchronization process. Each output corresponds to a count in counter 7.

Logic circuit 11 applies start pulses $E_9$, $E_{9A}$ and $E_{9B}$, as shown in FIGS. 2G, 2H and 2I, to synchronizing pulse circuits 17, 17A and 17B, respectively, in response to the outputs from counter 7. Each start pulse occurs simultaneously with a pulse in a corresponding pulse train from the beacons as shown in FIGS. 2A, 2B, 2C, 2G, 2H and 2I. Receiver 4 also applies control pulse train $E_6$ to pulse circuits 17, 17A and 17B. Pulse circuits 17, 17A and 17B provide synchronizing pulse trains $E_{10}$, $E_{10A}$ and $E_{10B}$, as shown in FIGS. 2J, 2K and 2L, to control the smoothing circuits.

Figure 3:
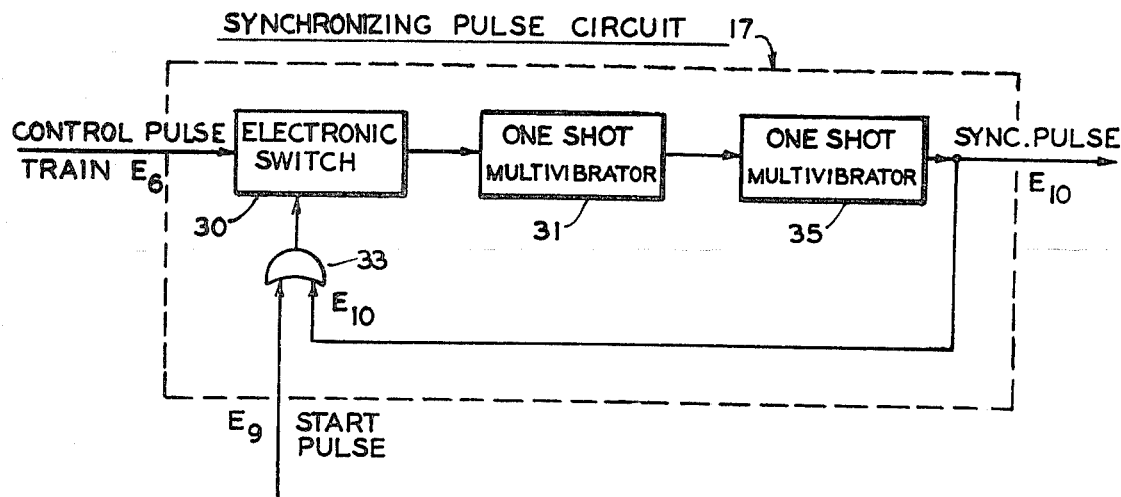
FIGS. 3 and 4 show a synchronizing pulse circuit and a smoothing circuit, respectively, used in the display system of FIG. 1 to stabilize the dot display.

Referring to FIGS. 1 and 3, there is shown synchronizing pulse circuit 17 including an electronic switch 30 and one shot multivibrators 31 and 35 connected in series and an OR gate 33 connecting an output of multivibrator 35 to switch 30. Control pulse train $E_6$ from receiver 4 is applied to switch 30 and start pulse $E_9$ from logic circuit 11 is applied to OR gate 33. Switch 30 passes a pulse in control pulse train $E_6$ corresponding to a pulse transmitted from the first beacon, in response to start pulse $E_9$ passed by OR gate 33. The passed pulse from switch 30 triggers multivibrator 31. Start pulse $E_9$ is terminated prior to another pulse in control pulse train $E_6$ so that switch 30 is thereafter controlled by synchronizing pulse train $E_{10}$, until the next start pulse $E_9$.

Multivibrator 31 provides a pulse having a pulse width corresponding to the repetition rate of the transmitted pulses from the beacons for controlling the repetition rate of synchronizing pulse train $E_{10}$, so that pulse train $E_{10}$ has the same repetition rate as the transmitted pulses from the beacons. The termination of the pulse from multivibrator 31 triggers multivibrator 35 causing multivibrator 35 to provide a synchronizing pulse $E_{10}$. Synchronizing pulse $E_{10}$ passes through OR gate 33 and causes switch 30 to pass another pulse in control pulse train $E_6$, corresponding to a pulse from the first beacon, to repeat the operation again. Since multivibrator 31 was triggered by a pulse in control pulse train $E_6$, corresponding to the first beacon, the time delay caused by the pulse from multivibrator 31 results in the pulses in synchronizing pulse train $E_{10}$ occurring simultaneously with pulses corresponding to pulses from the first beacon as shown in FIGS. 2A and 2J.

Synchronizing pulse circuits 17A and 17B operate in a similar manner to provide synchronizing pulse trains $E_{10A}$ and $E_{10B}$, respectively, that occur simultaneously with pulses transmitted by the other beacons as shown in FIGS. 2B, 2C, 2K and 2L.

Referring to FIG. 1, switch 5, counter 7, multivibrator 10 and flip-flop 14 cooperate to automatically restart synchronization on a periodic basis to assure a greater accuracy in the synchronization. Counter 7 provides another output $E_8$ to multivibrator 10 and to flip-flop 14 corresponding to a predetermined count related to the number of beacons.

Flip-flop 14 applies a disable signal to switch 5 causing it to block control pulse train $E_6$ in response to output $E_8$ causing counter 7 to stop counting. Multivibrator 10 applies a pulse to counter 7 and to flip-flop 14 whose width determines the time period for starting synchronization again. The termination of the pulse from multivibrator 10 resets counter 7 and flip-flop 14. Flip-flop 14 then applies an enable signal to switch 5 causing it to pass control pulse train $E_6$ to counter 7 to start counter 7 counting again which starts the synchronization as heretofore explained.

Synchronizing pulse circuit 17 applies synchronizing pulse train $E_{10}$ to identical smoothing circuits 18 and 19. Receiver 4 applies horizontal deflection pulse train $E_3$ and vertical deflection pulse train $E_4$ to smoothing circuits 18 and 19, respectively. Since pulses in synchronizing pulse train $E_{10}$ occur simultaneously with the pulses from the first beacon, smoothing circuits 18 and 19 will provide deflection pulses $E_{13}$ and $E_{14}$, respectively, as shown in FIGS. 2Q and 2U, corresponding to the average of the horizontal deflection pulses and the average of the vertical deflection pulse, respectively, related to the transmitted pulses from the first beacon. The effect of the reflected pulses on the deflection pulses corresponding to the first beacon is reduced by smoothing circuits 18 and 19. A read out control circuit continuously provides read out pulse train $E_{12}$, as shown in FIG. 2M, during operation of the display system to smoothing circuits 18 and 19.

Figure 4:
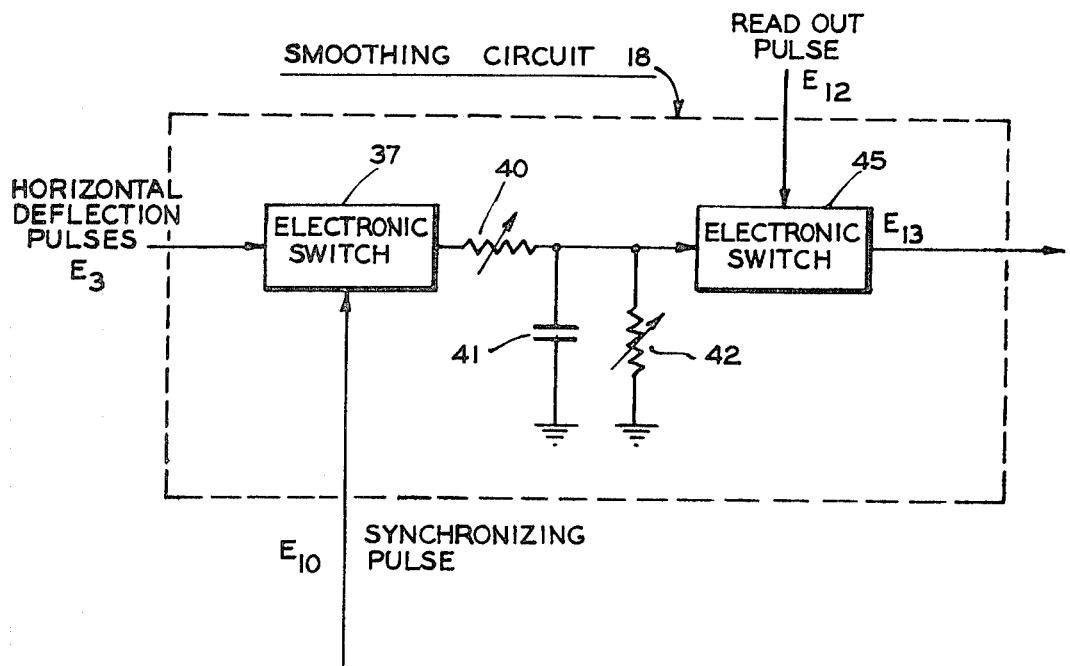

Referring to FIGS. 1 and 4, smoothing circuit 18 includes serially connected electronic switches 37 and 45 and a variable resistor 40 connected to receiver 4. Smoothing circuit 18 also includes a capacitor 41 and a variable resistor 42 connected to an input to switch 45 and to ground. Switch 37 receives horizontal deflection pulse train $E_3$ from receiver 4 and synchronizing pulse train $E_{10}$ from pulse circuit 17 and passes only those pulses of deflection pulse train $E_3$ corresponding to the transmitted pulses from the first beacon in response to synchronizing pulse train $E_{10}$. The passed pulses charge up capacitor 41 which partially discharge through resistor 42 between passed pulses to provide a voltage level which is proportional to the average level of the passed pulses. This level will vary at a much slower rate than the variations in level of the incoming pulses, thus providing a smoothing effect. The number of pulses that are averaged is controlled by the resistance value of resistors 40 and 42. Switch 45 is controlled by readout pulse train $E_{12}$ from read out control circuit 20 to pass the voltage across capacitor 41 as average horizontal deflection pulses $E_{13}$. Smoothing circuit 19 operates in a similar manner to provide average vertical deflection pulses $E_{14}$ which occur simultaneously with average horizontal deflection pulses $E_{13}$ as shown in FIGS. 2Q and 2T.

Referring to FIG. 1, receiver 4 applies horizontal deflection pulse train $E_3$ to smoothing circuits 18A and 18B and vertical deflection pulse train $E_4$ to smoothing circuits 19A and 19B. Synchronizing pulse circuits 17A and 17B apply synchronizing pulse trains $E_{10A}$ and $E_{10B}$ to smoothing circuits 18A and 19A and 18B and 19B, respectively. Read out control circuit 20 applies read out pulse trains $E_{12A}$ and $E_{12B}$, as shown in FIGS. 2N and 2P, to smoothing circuits 18A and 19A, and 18B and 19B, respectively. Smoothing circuits 18A, 18B, 19A and 19B are identical to smoothing circuit 18 and operate in a similar manner. Smoothing circuits 18A and 19A provide simultaneous average deflection pulses $E_{13A}$ and $E_{14A}$, respectively, as shown in FIGS. 2R and 2U. Smoothing circuits 18B and 19B provide simultaneous average deflection pulses $E_{13B}$ and $E_{14B}$, respectively, as shown in FIGS. 2S and 2V.

The average horizontal and vertical deflection pulses, from the smoothing circuits cause a cathode ray tube 24, having a face 27, to provide a stabilized dot display on the face 27 giving a visual impression of the runway. Cathode ray tube 24 has a horizontal deflection plate 25 connected to smoothing circuit 18, 18A and 18B and a vertical deflection plate 26 connected to smoothing circuit 19, 19A and 19B. Tube 25 also has a horizontal deflection plate 28 and a vertical deflection plate 29 connected to ground. Read out control circuit 20 also provides a bright up pulse train $E_{17}$ to a grid 29 of tube 24 for brightening up the display.

The present invention, as heretofore described, provides a stabilized display of dots corresponding to beacons outlining a runway of an airport. The present invention synchronizes itself with the transmission of pulses from the beacons so that deflection pulses corresponding to the beacons can be averaged to provide the stabilized dot display by reducing the effect of reflected pulses. The synchronization of the present invention with the transmitted pulses from the beacons is automatically self-started on a periodic basis to increase the accuracy of the synchronization. The present invention also eliminates the effect of radar and other unwanted signals on the same frequency as the beacons.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a system providing a display corresponding to the position of a plurality of sources transmitting pulse trains of different phases and in which the display bounces due to reflected pulses, means for stabilizing the display comprising means for receiving the pulse trains, means connected to the receiving means for providing average pulses corresponding to pulses in each pulse train, means connected to the receiving means and to the average pulse means for synchronizing each average pulse means with a corresponding pulse train, and means connected to the average pulse means for providing the display in accordance with the average pulses.

2. Stabilizing means of the kind described in claim 1 in which the receiving means provides deflection pulses corresponding to the pulses in each pulse train, and a control pulse train for each pulse in the pulse trains.

3. A display system of the kind described in claim 2 in which the synchronizing means includes means for automatically starting synchronization in response to the control pulses from the receiving means.

4. A display system of the kind described in claim 3 in which the automatic starting means includes means for counting the control pulses from the receiving means and providing an output corresponding to a count in the counting means, means connecting the receiving means to the counting means for controlling the starting and stopping of the counting means, a logic circuit connected to the counting means and responsive to the output from the counting means to provide a plurality of start pulses, each start pulse corresponding to a different received pulse train, and means connected to the receiving means, to the logic circuit and to the averaging means, for providing synchronizing pulse trains, each synchronizing pulse train means provides a synchronizing pulse train in phase with a corresponding received pulse train in accordance with a start pulse from the logic circuit and the control pulses from the receiving means related to the corresponding pulse train.

5. A system of the kind described in claim 4 in which each synchronizing pulse train means includes a switching means connected to the receiving means and to the logic circuit for passing the control pulses from the receiving means in response to a start pulse from the logic circuit or blocking the control pulses during the absence of a start pulse, a one shot multivibrator connected to the said switching means and responsive to a passed control pulse from the said switching means to provide a delay pulse having a pulse width corresponding to the repetition rate of the received pulse trains, and another one shot multivibrator connected to the average pulse means, to the said switching means and to the other multivibrator and responsive to the termination of the pulse from the other multivibrator to provide a pulse to the said switching means and to the average pulse means to cause the said switching means to pass another pulse from the receiving means to the other multivibrator so as to continuously recycle the operation of the synchronizing pulse train means to provide a synchronizing pulse train to the average pulse means.

6. A system of the kind described in claim 4 in which the deflection pulses from the receiving means include horizontal and vertical deflection pulses and the average pulse means includes a plurality of circuits, each circuit including a pair of networks connected to the receiving means and to a corresponding synchronizing pulse train means, one network receiving horizontal deflection pulses from the receiving means and the other network receiving vertical deflection pulses from the receiving means, each network including yet another switching means connected to the receiving means for passing the deflection pulses from the receiving means in response to pulses in a synchronizing pulse train from the corresponding synchronizing pulse train means and blocking the deflection pulses between pulses in the synchronizing pulse train, and an averaging circuit connected to the last mentioned switching means for averaging the passed deflection pulses from the last mentioned switching means and providing an output corresponding to the average of the deflection pulses corresponding to a received pulse train; and means connected to the averaging circuit in each network for providing the average deflection pulses in accordance with the outputs from the averaging circuits in the networks.

7. A system of the kind described in claim 6 in which each averaging circuit includes a capacitor, a resistor connecting the last mentioned switching means to the capacitor and controlling the charging of the capacitor by the passed deflection pulses, and another resistor connected so as to shunt the capacitor and controlling the discharge rate of the capacitor so that the capacitor provides the output corresponding to the average of the passed deflection pulses.

8. A system of the kind described in claim 6 in which the average pulse means includes a plurality of switches, each switch connected to the averaging circuit in a different network, and means connected to the switches for periodically applying read out pulses to positively control the switches to pass the outputs from the averaging circuits as pulses to provide the average deflection pulses.

9. A display system of the kind described in claim 4, in which the control means includes switching means connecting the receiving means to the counting means for passing the control pulses to the counting means from the receiving means until a command signal is applied to the switching means and blocking the control pulses from the receiving means in response to the c command signal, and a flip-flop connected to the counting means and to the switching means for providing the command signal in response to an output from the counting means corresponding to a count equal to the number of pulse train sources.

10. A display system of the kind described in claim 9 in which the synchronizing means also includes means for restarting synchronization on a periodic basis.

11. A display system of the kind described in claim 10 in which the restarting means includes a monostable multivibrator connected to the counting means and to the flip-flop and providing a delay pulse in response to the output from the counting means corresponding to the number of pulse train sources to reset the counting means and the flip-flop to restart the counting of the counting pulses from the receiving means by the control means after a predetermined time period has elapsed.

* * * * *